United States Patent [19]

Barnwell

[11] Patent Number: 5,794,453

[45] Date of Patent: Aug. 18, 1998

[54] APPARATUS AND METHOD FOR REMOVING CONDENSABLE MATERIAL FROM A GAS

[75] Inventor: James W. Barnwell, New Castle, Del.

[73] Assignee: Flair Corporation, Ocala, Fla.

[21] Appl. No.: 681,328

[22] Filed: Jul. 22, 1996

[51] Int. Cl.$^6$ .......................... B01D 53/00; F25D 17/06
[52] U.S. Cl. .................. 62/79; 62/80; 62/93; 62/129; 95/39
[58] Field of Search ..................... 62/90, 93, 129, 62/173, 79, 80; 95/39

[56] References Cited

U.S. PATENT DOCUMENTS

| | | | |
|---|---|---|---|
| 3,225,517 | 12/1965 | Wachsmuth | 55/31 |
| 3,247,681 | 4/1966 | Hankison et al. | 62/317 |
| 3,258,932 | 7/1966 | Kern | 62/93 |
| 3,585,808 | 6/1971 | Huffman | 62/90 |
| 3,739,594 | 6/1973 | Freese | 62/93 |
| 4,287,724 | 9/1981 | Clark | 62/272 |
| 4,638,852 | 1/1987 | Basseen et al. | 62/93 X |
| 5,031,411 | 7/1991 | Gehring et al. | 62/93 |
| 5,275,233 | 1/1994 | Little | 165/111 |
| 5,428,963 | 7/1995 | Korycki et al. | 62/93 |

FOREIGN PATENT DOCUMENTS

| | | | |
|---|---|---|---|
| 642948 | 6/1962 | Canada | 62/93 |
| 405096123 | 4/1993 | Japan | 62/90 |

OTHER PUBLICATIONS

"PR Series Refrigerated Compressed Air Dryers," undated, Hankison International, Canonsburg, PA 15317–1700.

"Deltech Compressed Air Dryers: Pyramid 2000 Compressed Air Treatment Systems and Hydrogard Refrigerated Compressed Air Dryers," Mar. 1995, Flair Industrial Air Division.

"Refrigerated Compressed Air Dryers: Series H," undated, Hankison Division of Hansen, Inc.; Canonsburg, PA 15317.

"Compressed Air Dryers," Bulletin 222, issued Jul. 1984, Arrow Pneumatics, Inc., P. O. Box 739, Mundelein, IL 60060–0739.

"Aftercooler–Dryer–Reheater System," undated, Pioneer Air Systems, Inc., 8537 Ronda Drive, Canton, MI 48187.

"Non–Cycling Refrigerated Air Dryers," undated, Zeks Air Drier Corporation, a subsidiary of Kemp Company, Malvern Industrial Park, Box 396, Malvern, PA 19355.

Deltech Engineering, Inc., "Hydrogard Refrigerated Air Dryers", Oct. 1986, 2 pages.

Primary Examiner—William E. Wayner
Attorney, Agent, or Firm—Kennedy, Covington, Lobdell, & Hickman, LLP

[57] ABSTRACT

An improved method and apparatus is disclosed for removing condensable material from a gas. The gas is caused to flow in series through a chiller for cooling the gas and condensing the condensable material from the gas, then through a separator to separate the condensate from the gas, and then passing the gas through a reheater to reheat the gas. A predetermined charge of refrigerant is passed in a closed cycle through the chiller to cool the gas by absorbing the heat from the gas and evaporating, then the gaseous refrigerant is compressed by a compression unit having an electric drive means in which an amount of energy is added to the gaseous refrigerant. The hot, pressurized, gaseous refrigerant is then passed through an auxiliary condenser sized to remove the energy that was added to the refrigerant by the compression unit at no load conditions, then the refrigerant is passed through the reheater to further condense the refrigerant and to transfer heat to the exiting gas. The refrigerant then exits the reheater and returns to the chiller, completing the closed cycle. The predetermined charge of refrigerant is sized to cause the refrigerant exiting the reheater to be in a substantially gaseous state when there is no flow of gas through the reheater and to cause the pressure of the refrigerant exiting the reheater to generally decrease as the flow of gas through the reheater increases.

23 Claims, 3 Drawing Sheets

APPARATUS AND METHOD FOR REMOVING CONDENSABLE MATERIAL FROM A GAS

BACKGROUND OF THE INVENTION

The present invention relates to a method and apparatus for removing condensable material from a gas and, more particularly, to removing the condensable material by lowering the temperature of the gas to condense the condensable material from the gas.

It is often desirable when using a gas, such as compressed air, that the gas be substantially free of condensable material, such as water. One way to remove such condensable material is cooling the gas below the condensation temperature of the condensable material, condensing the condensable material, and then draining this condensable material from the gas. Then the gas may continue on to the desired application substantially free of the condensable material.

A particularly important application of removing such condensable material from a gas is to remove water from compressed air, i.e., drying the compressed air. In compressed air systems, the water vapor within the air may form the liquid phase during compression or temperature changes of the air. An undesirable amount of water in compressed air lines can cause many problems, such as clogged filters, accuracy variation of instrumentation, reduction of the air pressure, promotion and acceleration of corrosion, surface blemishes in paint spraying operations, water spotting of plastic parts during blow-molding, clogged sand blasters, etc., and often requires manually operated drain traps to remove condensed moisture from compressed air lines. Removing the water from the compressed air prior to using the compressed air in the end application reduces or eliminates these problems and significantly reduces the costs and losses associated therewith.

Typical conventional refrigerated air dryers pass the compressed air through a refrigerant-to-compressed air heat exchanger where the compressed air is cooled, condensing condensable material contained in the airstream. The condensate is then removed by a separation device and the compressed air continues on to its end application. In some dryers, the dehumidified air is passed through an air-to-air heat exchanger to precool the incoming humid compressed air and to reheat the exiting dehumidified compressed air.

The refrigeration cycle in such typical conventional refrigerated air dryers passes low pressure liquid refrigerant into the refrigerant-to-compressed air heat exchanger which removes heat from the compressed airstream and boils, becoming mostly vapor. The low pressure refrigerant gas then passes into an accumulator that collects and stores any excess liquid refrigerant, ensuring that only gas leaves the accumulator to go on to the refrigerant compressor. Liquid slugging into the refrigerant compressor may damage the compressor and lead to an early failure of the equipment and may reduce the efficiency of the refrigeration cycle. The low pressure refrigerant gas is then compressed and exits the compressor as a high pressure hot refrigerant gas. The high pressure hot refrigerant gas is then cooled and condensed into a liquid in a refrigerant condenser. This high pressure liquid refrigerant is then stored in a liquid receiver until it is needed. As the high pressure liquid refrigerant leaves the liquid receiver, it passes through a refrigerant filter/dryer that removes moisture and particulates from the refrigerant, and proceeds to a thermal expansion valve, where the temperature and pressure of the refrigerant are lowered. After passing through the thermal expansion valve, the refrigerant proceeds to the refrigerant-to-compressed air heat exchanger to complete the cycle.

In such typical conventional systems, a reduction in load (air flow) results in decreased refrigerant pressure. Conversely, an increase in load results in increased refrigerant pressure. At no load, the pressure is at its lowest, and, if low enough, the refrigerant-to-compressed air heat exchanger may freeze up, damaging this heat exchanger and making the system inoperable. Thus, a hot refrigerant gas bypass valve is provided so that high pressure hot refrigerant gas exiting the compressor may be directed downstream of the thermal expansion valve to raise refrigerant pressure in the low pressure side of the refrigeration cycle and reduce the occurrence of freeze up. If the pressure is too low, the capacity of the hot refrigerant gas bypass valve is decreased and the system may still freeze up. Thus, a combination of buffering devices is required in conventional systems to buffer the temperature and pressure change impact on the system from varying the load on the system.

Many conventional systems also have a de-superheating valve to prevent extremely hot gas from flowing back into the compressor, which could occur at low loads. This valve is located downstream of the refrigerant condenser and leads directly into the inlet of the accumulator (or the refrigerant compressor, if there is no accumulator). This allows the temperature of the gas entering the refrigerant compressor to be controlled to a level ensuring proper compressor operation.

Many conventional systems are also equipped with a suction heat exchanger in the suction feed prior to the refrigerant compressor. This device uses the heat in the refrigerant liquid line to vaporize any liquid exiting the refrigerant-to-compressed air heat exchanger, thereby protecting the refrigerant compressor from liquid slugging while subcooling the liquid refrigerant.

The aforesaid conventional refrigerated air dryers generally require some combination of accumulator, liquid receiver, hot gas bypass valve, de-superheating valve, and suction heat exchanger in order to maintain a buffer within the system to control temperatures and pressures such that the dryer effectively operates under a full range of compressed air flow conditions, from no load to full load, without freezing up and damaging components. This requires a charge of a considerable quantity of refrigerant to provide the necessary buffering capabilities.

An example of such refrigerated dryer may be found in U.S. Pat. No. 3,585,808. Other examples of refrigerated dryers in various configurations may be found in U.S. Pat. Nos. 3,225,517; 3,247,681; 3,258,932; 3,739,594; 4,287,724; 4,638,852; 5,031,411; 5,275,233; and 5,428,963.

It is desirable to provide a method and apparatus for removing condensable material from a gas that requires a minimum amount of buffering in order to eliminate as much equipment within the refrigeration cycle as possible, thus minimizing, for example, capital expenditures, repair expense, and equipment down time. It is also desirable to minimize the amount of refrigerant charged to the refrigeration cycle in order to minimize, for example, capital expenditures and environmental concerns. It is also desirable to provide such a method and apparatus that increases the cooling capacity and efficiency of the refrigeration cycle and improves the ability of the system to remove condensable material from the gas.

SUMMARY OF THE INVENTION

It is an object of the present invention to provide an improved method and apparatus for removing condensable material from a gas, minimizing the required equipment and the amount of refrigerant charged to the refrigeration cycle. It is a further object of the present invention to be able to operate the apparatus and method efficiently from no load through full load conditions.

The present invention provides an improved method and apparatus for removing condensable material from a gas (e.g., air), by causing the gas to flow in series through a chiller for cooling the gas and condensing the condensable material from the gas, then through a separator for separating the condensed material from the gas and draining the condensate, and then through a reheater to reheat the gas prior to its return to service.

The cooling in the chiller is provided by passing a predetermined charge of refrigerant in a closed refrigeration cycle through the chiller to cool the gas by absorbing heat from the gas and evaporating. The refrigerant is then passed through a motor-driven compression unit, then through an auxiliary condenser sized to remove from the refrigerant the energy that is added to the refrigerant by the compression unit under no load conditions, and then flows through the reheater, where it reheats the gas prior to the gas returning to service, which also further condenses and subcools the refrigerant. Then the refrigerant passes back through the chiller, completing the closed cycle.

The predetermined charge of refrigerant is sized to cause the refrigerant that exits the reheater to be in a substantially gaseous state when there is no flow of gas through the reheater and to cause the pressure of the refrigerant exiting the reheater to generally decrease as the flow of gas through the reheater increases.

DETAILED DESCRIPTION OF THE PREFERRED EMBODIMENT

While the present invention may be used to remove a wide variety of condensable material from many different gases, the invention will be detailed with respect to removing water from compressed air.

Figure 1:
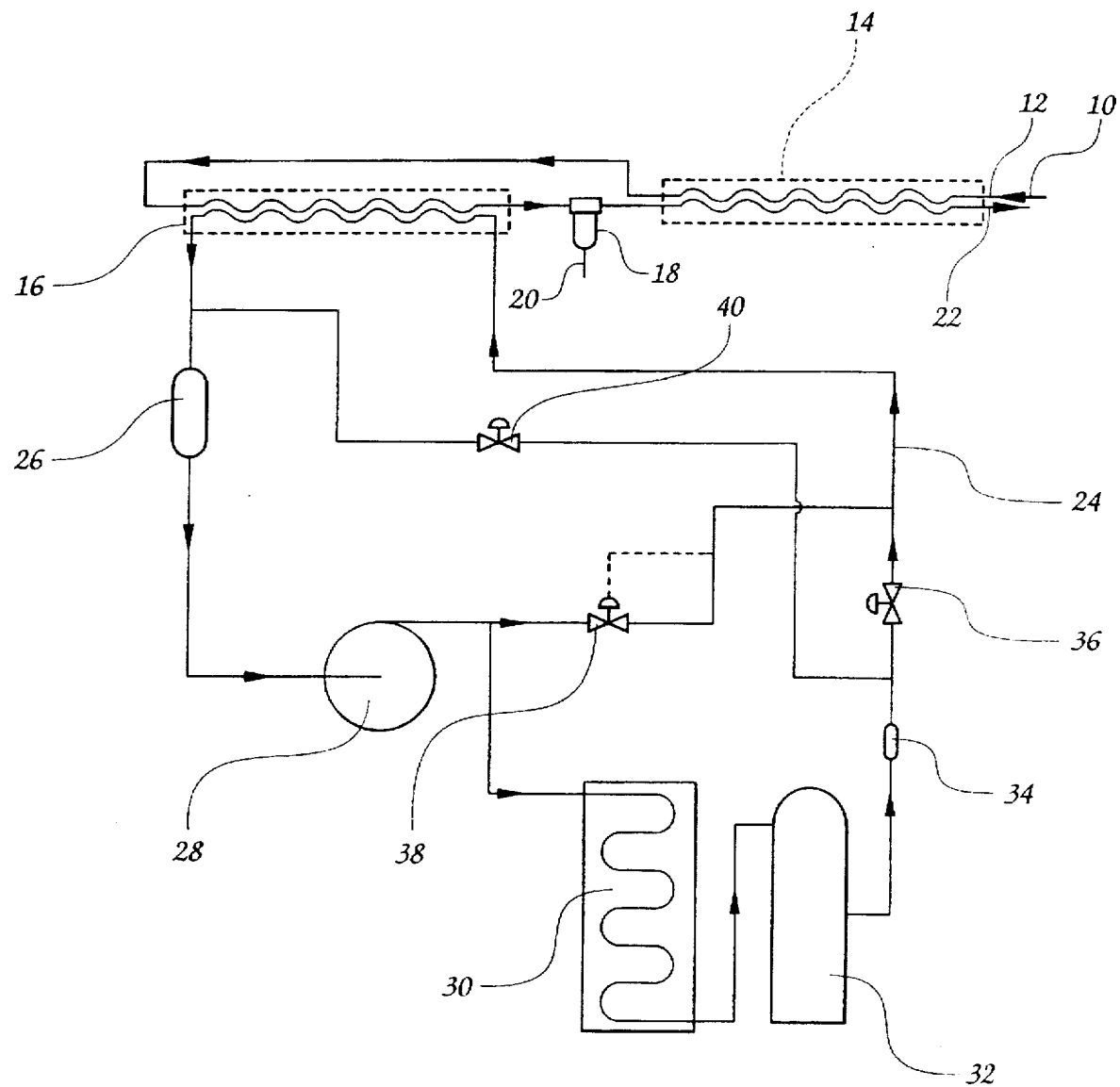
FIG. 1 is a schematic representation of a typical prior art dryer.

FIG. 1 illustrates a conventional refrigerated dryer, wherein the compressed air 10 represented by flow arrows enters the inlet 12 and passes through the precooler 14. The compressed air 10 then flows through chiller 16, wherein its temperature is lowered below the condensation temperature of the condensable material and the condensable material condenses. The compressed air 10 then flows through a separator 18, wherein condensate 20 is separated from the compressed air 10, and then back through precooler 14, wherein it absorbs heat from the incoming compressed air 10, and exits through outlet 22.

As shown in FIG. 1, the refrigeration cycle of conventional refrigerated dryers includes passing the refrigerant 24 represented by flow arrows through the chiller 16, an accumulator 26, a refrigerant compressor 28, a condenser 30, a receiver 32, a filter/dryer 34, an expansion valve 36, and back through the chiller 16. A hot gas bypass valve 38 and a de-superheating valve 40 are provided in conventional refrigerated dryers to control the temperature and pressure of the refrigerant 24 in the chiller 16 and in the inlet to the refrigerant compressor 28 to avoid equipment malfunction, as previously discussed. As previously noted, a compressor suction heat exchanger (not shown) may be used to protect the refrigerant compressor 28 from liquid slugging in systems where the refrigerant charge is sufficient for that potential.

Figure 2:
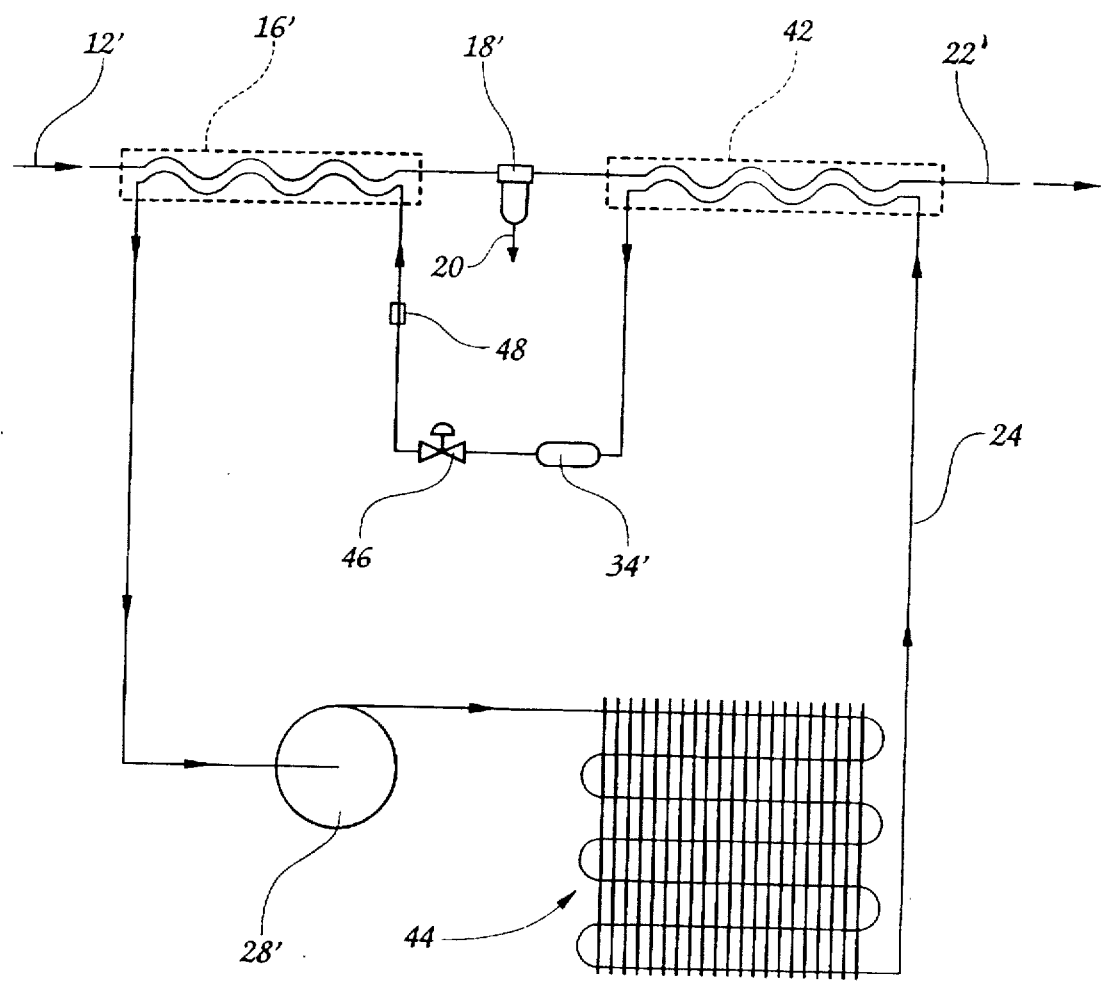
FIG. 2 is a schematic representation of the present invention.

As illustrated in FIG. 2, the present invention is one component of a compressed air system and includes a compressed air inlet 12' through which the compressed air 10 enters a conventional chiller 16', in which the temperature of the compressed air 10 is lowered below the condensation temperature of condensable material contained within compressed air 10, and such condensable material condenses. The compressed air then enters a conventional separator 18', wherein the condensate 20 is separated and drained, before continuing through reheater 42, where the compressed air 10 absorbs heat from the refrigerant 24 (illustrated by flow arrows in FIG. 2) prior to exiting through compressed air outlet 22'.

FIG. 2 also illustrates the closed refrigeration cycle of the present invention, wherein a predetermined charge of the refrigerant 24 passes through the chiller 16', where it absorbs heat from the compressed air 10 and boils. The gaseous refrigerant 24 then exits the chiller 16' and proceeds to a conventional motor-driven refrigerant compression unit 28'.

The compression unit 28' has a compressor and an electric drive motor. The compression unit 28' compresses the refrigerant 24 and adds energy in the form of heat to the refrigerant 24 as it passes through the compression unit 28'. In a preferred embodiment, the gaseous refrigerant 24 is passed over windings of the motor prior to being compressed in order to cool the motor, all in a manner to be described presently. The hot, compressed gaseous refrigerant 24 then passes through a conventional auxiliary condenser 44 which is sized to remove from the refrigerant 24 the heat added thereto by the compression unit 28' under no load conditions. The refrigerant 24 then passes through the reheater 42, wherein it transfers heat to the compressed air 10 before the compressed air 10 exits through outlet 22'. In the reheater 42, the refrigerant 24 condenses as a result of the heat transferred to the compressed air 10 and then exits reheater 42 to enter chiller 16', wherein it cools the compressed air 10 flowing into the inlet 12' and through the chiller 16', completing the closed refrigeration cycle.

In a preferred embodiment, the refrigerant 24 exiting the reheater 42 first passes through a conventional filter/dryer 34', wherein water and particulate matter are removed, then passes through an expansion device 46. The refrigerant 24 then passes by a conventional temperature-sensitive color change label 48, from which the approximate temperature of the refrigerant 24 may be determined to evaluate whether the apparatus is properly operating.

The predetermined charge of refrigerant 24 is sized to cause the refrigerant exiting the reheater 42 to be substantially in a gaseous state when there is no flow of compressed air 10 through the reheater 42 and is further sized to cause the pressure of the refrigerant 24 exiting the reheater 42 to generally decrease as the flow of compressed air 10 through the reheater 42 increases. This pressure response is opposite to the conventional operating characteristics in which the refrigerant pressure decreases as the compressed air 10 flow decreases. Such an opposite result is unexpected and results from the features and dynamics of the present invention. This unexpected operating pressure characteristic also yields significant subcooling of the refrigerant 24 exiting the reheater 42, resulting in increased refrigeration capacity and improved efficiency.

This is in contrast to a conventional refrigerated dryer, illustrated in FIG. 1, in which the pressure of the refrigerant 24 exiting the precooler 14 generally decreases as the flow of compressed air 10 through the precooler 14 decreases, as previously discussed. Thus, the temperature and pressure of the refrigerant 24 as it reaches the chiller 16 under very low compressed air 10 flow conditions tend to freeze up the chiller under conditions in which there is no compressed air 10 flowing through the chiller 16. For this reason, conventional dryers include such components as an accumulator 26, a receiver 32, a hot gas bypass valve 38, a de-superheating valve 40, and a suction heat exchanger (not shown).

Such components are unnecessary in the present invention, because the refrigerant 24 pressure increases as the flow of compressed air 10 decreases. This pressure increase ensures that the chiller 16' does not freeze up and that adequate refrigerant pressure and temperature are present at the inlet to the compression unit 28'. Such operating pressure characteristics also result in increased refrigeration capacity (lower refrigerant pressure) as the load (compressed air 10 flow) increases, thus improving refrigeration efficiency and providing this increased capacity when it is most needed—at increased compressed air 10 flows.

Preferably, the predetermined charge of refrigerant is further sized to cause the refrigerant 24 entering the expansion device 46 to be in the liquid state when there is compressed air 10 flow through the reheater 42 and in the gaseous state when there is no compressed air 10 flow through reheater 42. Thus, the refrigerant 24 charge is such that there is a liquid seal formed at the expansion device 46 only when there is compressed air 10 flow through the reheater 42. At no load conditions, the expansion device 46 passes gaseous refrigerant 24, protecting the system from liquid refrigerant slugging to the compression unit 28'. If there were an excessive charge of refrigerant 24, this could cause liquid flood-back to the refrigerant compression unit 28', resulting in damage to the compressor and unstable refrigerant system characteristics. Passing gaseous refrigerant 24 under no-load conditions eliminates such undesirable operatic characteristics.

With the properly sized predetermined charge of refrigerant 24, the refrigerant does not-flash across the expansion device 46 at full compressed air 10 flow due, at least in part, to the increased amount of subcooling of the refrigerant 24. Because of the lower refrigerant discharge pressure from the reheater 42 and the increased amount of refrigerant subcooling, a conventional expansion valve is not necessary, and an expansion device 46, such as a capillary tube, constant pressure expansion valve, orifice, or the like, will suffice.

Conventional refrigerated dryers use thermal expansion valves to control the refrigerant suction superheat and hot gas bypass valves to control the chiller refrigerant pressure and therefore the minimum chiller temperature. As the load decreases in a typical dryer, the discharge pressure decreases. The lower the discharge pressure is, the lower will be the capacity of the hot gas bypass valve, but this is exactly when the hot gas bypass valve needs to work the hardest to prevent freezing in the chiller.

Because the refrigerant discharge pressure increases with decreased load in the present invention, a constant pressure expansion valve may be used without the possibility of freezing. When the refrigerant charge is limited to a properly sized predetermined charge, there is no possibility of liquid refrigerant slugging the refrigerant compressor and no need for a hot gas bypass valve or liquid receiver. This simplifies the system (fewer control lines, temperature/pressure sensing devices, etc.) and provides cost savings.

The preferred compression unit 28' is a conventional, hermetically sealed, refrigerant-cooled piston compressor, in which the refrigerant cools the electric motor that drives the compressor by passing over the motor windings (not shown) prior to entering the compressor. Other compressors may also be used, as well as other drive means. If the motor used is not cooled by the refrigerant 24, then the auxiliary condenser 44 is still sized to remove the energy inherently put into the system by the compression unit at no load, but the heat added by cooling the motor will not be a factor in the size of the auxiliary condenser 44. This energy can be determined by a heat balance calculation, calculated for no load conditions. By using a motor that is compact and is cooled by the refrigerant 24, as discussed above, the motor and compressor may be disposed together in a relatively compact compression unit 28' that allows for greater mobility and flexibility of locations for the apparatus. Such arrangement also allows the compression unit 28' to be sealed to minimize contaminants interfering with the operation of the motor and compressor, and extends the life of the unit.

Calculating the heat balance and sizing the auxiliary condenser 44 based on no load conditions, helps to ensure proper operating characteristics at no load to avoid freeze up. When there is compressed air 10 flow through the system, then the reheater 42 operates to remove any additional energy added to the refrigerant 24 by virtue of the increased load.

By sizing the auxiliary condenser 44 in this manner, and by sizing the predetermined charge of refrigerant 24 as discussed above, the need for a liquid receiver, a hot gas bypass valve, a suction accumulator, a de-superheating valve, and a suction liquid heat exchanger is eliminated and the refrigeration system is simplified without any loss of performance and control. In fact, because the dynamics of the system are controlled to achieve the unexpected result that the outlet pressure of the refrigerant 24 from the reheater 42 generally decreases as the flow of compressed air 10 through the reheater 42 increases, the efficiency of the refrigeration cycle is significantly improved and the capacity is increased, even with substantially fewer components. This reduction in the number of components reduces capital costs, maintenance expenses, outages, and equipment failures.

Figure 3:
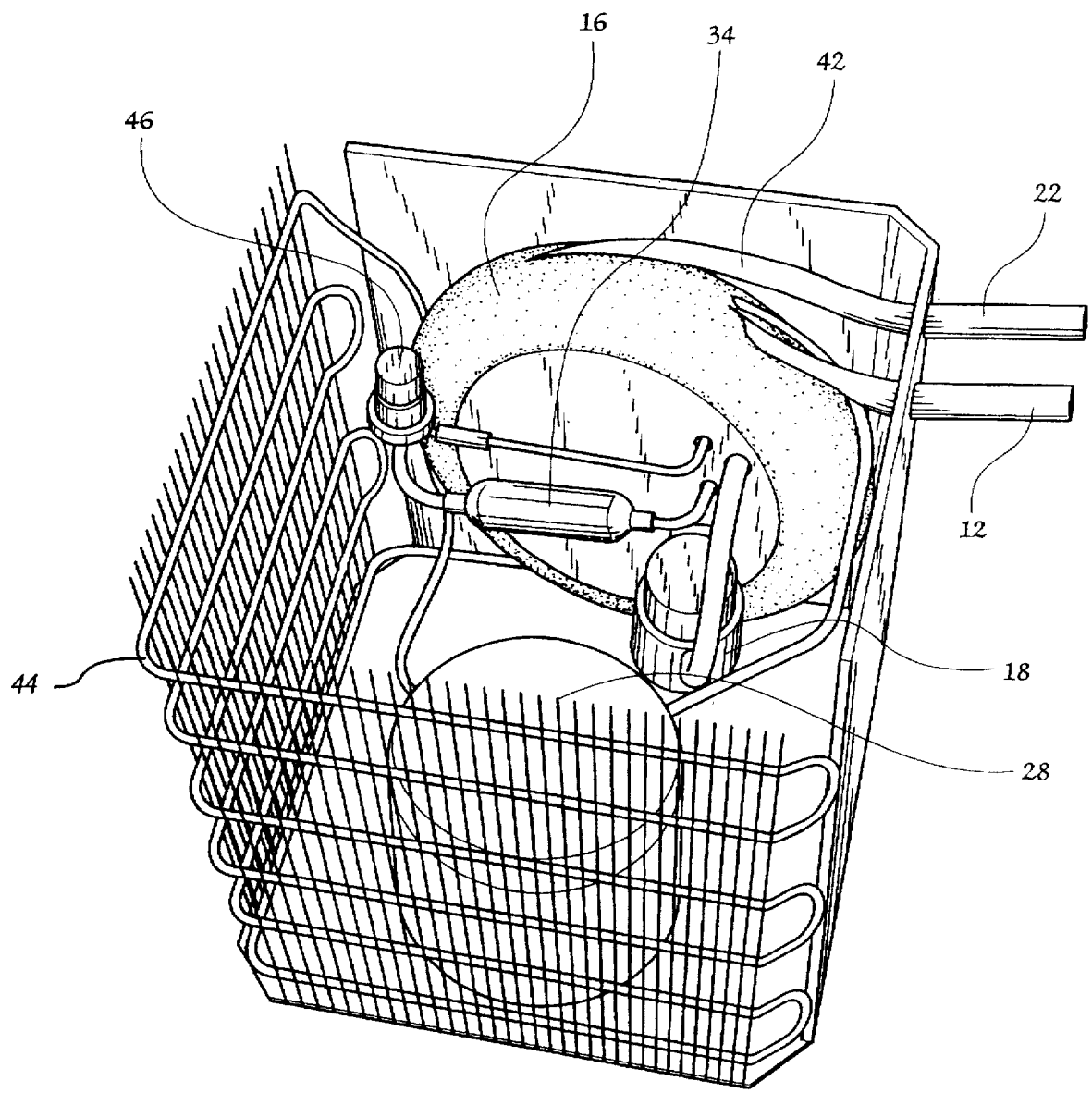
FIG. 3 is a perspective view of an embodiment of the present invention.

Preferably, the auxiliary condenser 44 is part of the external structure of the apparatus, as illustrated in FIG. 3. This configuration allows for an even more compact size, without any adverse impact on the efficiency or the capacity of the apparatus.

It is preferred that the refrigerant used in the invention is R-134a for a compressed air cycle in which water is the condensable material to be removed. It is to be noted that other halogenated hydrocarbon refrigerants, such as R-12 and R-22, may also be used in this particular application. It is important to note that the refrigerant used may be any suitable refrigerant, based upon material conditions, the particular gas from which the condensable material is to be removed, the particular condensable materials, operating temperatures, costs, etc., without departing from the spirit of the invention. The invention as described herein is particularly suitable for medium to high temperature refrigerants, but use with a wide variety of refrigerants is anticipated.

The chiller 16' and reheater 42 may be of any conventional heat exchanger design, although counterflow coiled tube-by-tube heat exchangers have been noted to provide acceptable results while minimizing the size and cost associated with these heat exchangers. It is noted that tube-in-tube heat exchangers also provide satisfactory results, particularly for larger systems. While counterflow heat exchangers are preferred, the present invention may also be practiced with parallel flow heat exchangers. The auxiliary condenser 44 may be of any conventional design; a wire-on-tube static heat exchanger has been noted to provide acceptable results and is particularly conducive to construction as part of the external structure of the apparatus. It would be obvious to one with ordinary skill in the art that these types of heat exchangers may be modified to meet particular circumstances without departing from the spirit of the invention. One example of such modification is the use of an auxiliary condenser that is fan cooled.

The separator 18' may be any device for removing condensate from gas, such as a mechanical separator, demister, coalescing filter, or any other similar device without departing from the spirit of the invention.

It is to be noted that the system may be sized such that the temperature of the compressed air 10 at the outlet 22' is greater than the temperature of the compressed air 10 at the inlet 12' without departing from the spirit of the invention.

Typical temperatures of the air at the inlet 12' are less than 140° F. Generally, the temperature of the refrigerant 24 transmitted to the refrigerant compression unit 281 should be kept less than about 95° F. to prevent damage to the compressor and to ensure maximum refrigeration efficiency.

In one typical application of the present invention, water is removed from saturated compressed air flow of about 7 scfm at 100°F. and 100 psig such that the outlet dewpoint of the air is less than about 40° F. Four ounces of R-134a refrigerant are charged to the refrigeration cycle. The chiller is a coiled tube-by-tube, counterflow heat exchanger sized for at least about 10.4 BTU/min. The compression unit is a hermetically sealed, refrigerant-cooled piston compressor rated at 0.05 hp. The auxiliary condenser is a wire-on-tube heat exchanger sized for about 2½ BTU/min, approximately the amount of energy added to the refrigerant by the compression unit at no load. The reheater is a coiled tube-by-tube counterflow heat exchanger sized for at least about 11.5 BTU/min. This system yielded the operating characteristics discussed herein and the refrigerant at the outlet of the reheater was subcooled approximately 520° F.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. An apparatus for removing condensable material from a gas comprising:

a flow through gas system which includes in series a chiller for cooling said gas and condensing said condensable material from said gas, a separator for separating said condensed material from said gas and draining away said condensate, and a reheater for reheating said gas;

a closed refrigerant system which passes a predetermined charge of refrigerant in series through said chiller to cool said gas by absorbing heat from said gas and evaporating, through a compression unit in which said refrigerant is compressed and an amount of energy is added thereto, then through an auxiliary condenser sized to remove from said refrigerant the energy added thereto by said compression unit at no load conditions, and then through said reheater and back to said chiller; and wherein said predetermined charge of refrigerant is sized to cause said refrigerant exiting said reheater to be substantially in a gaseous state when there is no flow of gas and to cause the pressure of said refrigerant exiting said reheater to generally decrease as said flow of gas through said reheater increases.

2. The apparatus of claim 1, further comprising a refrigerant expansion device through which the refrigerant passes after leaving the reheater and before entering the chiller.

3. The apparatus of claim 2, wherein the predetermined charge of refrigerant is further sized to cause said refrigerant entering said refrigerant expansion device to be in the liquid state when there is gas flow and in the gaseous state when there is no gas flow.

4. The apparatus of claim 2, further comprising a refrigerant filter/dryer to remove water and particulate matter from said refrigerant through which said refrigerant passes after leaving said reheater and before entering said expansion device.

5. The apparatus of claim 1, further comprising a refrigerant filter/dryer to remove water and particulate matter from said refrigerant through which the refrigerant passes after leaving the reheater and before entering the chiller.

6. The apparatus of claim 1, wherein said compression unit includes a compressor and an electric drive motor, said motor having windings over which said refrigerant passes to cool said motor before said refrigerant is compressed.

7. The apparatus of claim 6, wherein said compressor is a piston compressor.

8. The apparatus of claim 6, wherein said compression unit is hermetically sealed.

9. The apparatus of claim 1, further comprising a temperature sensitive color change label downstream of the reheater and upstream of the chiller for sensing the temperature of the refrigerant passing thereby.

10. The apparatus of claim 1, wherein the gas is compressed.

11. The apparatus of claim 1, wherein the gas is air.

12. The apparatus of claim 1, wherein the condensable material is water.

13. The apparatus of claim 1, wherein the auxiliary condenser is part of the external structure of the apparatus.

14. The apparatus of claim 1, wherein the auxiliary condenser exchanges heat to air by forced movement of the air thereover.

15. The apparatus of claim 1, wherein the refrigerant is a halogenated hydrocarbon.

16. The apparatus of claim 15, wherein the refrigerant is a halogenated hydrocarbon selected from the group consisting of R-12, R-22, and R-134a.

17. A method of removing condensable material from a gas comprising the steps of:

causing said gas to flow in series through a chiller for cooling said gas and condensing said condensable material from said gas, then through a separator for separating said condensed material from said gas and draining away said condensate, and then through a reheater for reheating said gas;

passing a predetermined charge of refrigerant in series through said chiller to cool said gas by absorbing heat from said gas and evaporating, through a compression unit in which said refrigerant is compressed and an amount of energy is added to the refrigerant, then through an auxiliary condenser sized to remove from said refrigerant the energy added thereto by said compression unit under no load conditions, and then through said reheater and back to said chiller; and sizing said predetermined charge of refrigerant to cause said refrigerant exiting said reheater to be in a substantially gaseous state when there is no flow of gas and to cause the pressure of said refrigerant exiting said reheater to generally decrease as said flow of gas through said reheater increases.

18. The method of claim 17, further comprising the step of passing the refrigerant through a refrigerant expansion device after passing through said reheater and before passing through said chiller.

19. The method of claim 18, wherein the step of sizing said predetermined charge of refrigerant further comprises causing said refrigerant to be in a substantially liquid state when entering the refrigerant expansion device during periods of gas flow, and in a substantially gaseous state during periods of no gas flow.

20. The method of claim 18, further comprising passing said refrigerant through a filter/dryer to remove water and particulate matter from said refrigerant after passing through said reheater, and before passing through said expansion device.

21. The method of claim 17, further comprising passing said refrigerant through a filter/dryer to remove water and particulate matter from said refrigerant after passing through said reheater and before passing through said chiller.

22. The method of claim 17, further comprising the step of passing the refrigerant past a temperature sensitive color change label after passing through said reheater and before passing through said chiller to determine the approximate temperature of the refrigerant.

23. An apparatus for removing condensable material from a compressed gas comprising:

a flow through compressed gas system which includes in series a chiller for cooling said compressed gas and condensing said condensable material from said compressed gas, a separator for separating said condensed material from said compressed gas and draining away said condensate, and a reheater for reheating said compressed gas;

a closed refrigerant system which passes a predetermined charge of refrigerant in series through said chiller to cool said compressed gas by absorbing heat from said compressed gas and evaporating, through a compression unit having a compressor and a refrigerant-cooled, electric drive means in which said refrigerant is compressed and an amount of energy is added thereto, then through an auxiliary condenser sized to remove from said refrigerant the energy added thereto by said compression unit under no load conditions, through said reheater, through a refrigerant filter/dryer to remove water and particulate matter from said refrigerant, through a refrigerant expansion device, past a temperature sensitive color change label to determine the approximate temperature of said refrigerant, and then back to said chiller; and wherein said predetermined charge of refrigerant is sized to cause said refrigerant exiting said reheater to be substantially in a gaseous state during periods of no compressed gas flow, to cause the pressure of said refrigerant exiting said reheater to generally decrease as said flow of compressed gas through said reheater increases, and to ensure that there is a liquid refrigerant seal at the refrigerant expansion device during periods of compressed gas flow, with the auxiliary condenser being part of the external structure of the apparatus.

* * * * *